Jan. 17, 1950  P. B. SEBRING ET AL  2,495,023
DISCRIMINATOR CIRCUIT
Filed May 3, 1945  2 Sheets-Sheet 1

Inventor
PAUL B. SEBRING.
HARVEY BROOKS
By Ralph L. Chappell
Attorney

Inventors
PAUL B. SEBRING,
HARVEY BROOKS.
By Ralph L. Chappell
Attorney

Patented Jan. 17, 1950

2,495,023

UNITED STATES PATENT OFFICE 2,495,023

DISCRIMINATOR CIRCUIT

Paul B. Sebring, Cambridge, Mass., and Harvey Brooks, Bennington, Vt., assignors to the United States of America as represented by the Secretary of the Navy Application May 3, 1945, Serial No. 591,760

3 Claims. (Cl. 250—27)

This invention relates to a discriminator, and more specifically to an improved type of such device.

The term discriminator, as used herein, signifies a device for the conversion of variations in frequency to variations in amplitude. Such devices may be used to reproduce the modulation on a frequency modulated wave, for developing a direct current voltage responsive to changes in frequency of an incoming wave, or for other purposes. The discriminator hereinafter described may be advantageously used for the above or for any other purpose desired.

The present invention has for one of its objects to improve the operation of discriminators. More particularly, the general object is to produce a discriminator with a much greater voltage output for a given change in frequency.

Other objects and advantages will become more apparent from the following detailed description of a preferred embodiment of the invention, in connection with the accompanying drawings in which.

Figure 1:
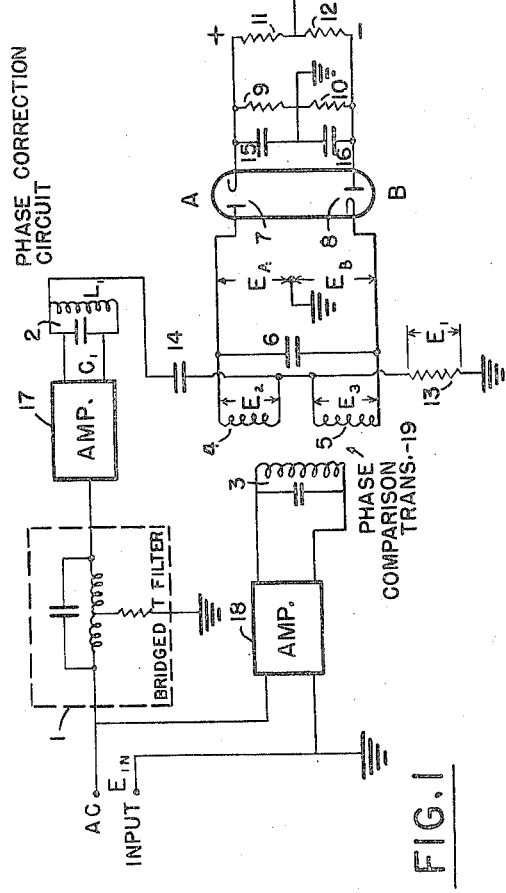
Fig. 1 is a schematic circuit diagram of the invention.

Referring particularly to Fig. 1, the discriminator includes a primary resonant circuit 3 inductively coupled to a secondary resonant circuit 4—5—6 which includes a center tapped inductance 4—5 and parallel capacitance 6, the two ends of which are connected to the anode and cathode elements of diode rectifiers 7 and 8. It will be noted that rectifiers 7 and 8 are connected with one end of inductance 4 to the anode of rectifier 7, and one end of inductance 5 to the cathode of rectifier 8.

Connection between the resonant circuit 3 and input terminal is made, if desired, through amplifier 18 ahead of filter unit 1; and connection between the center tap of the resonant secondary circuit 4—5—6 is made to the input terminals through amplifier 17 after filter unit 1. The amplifiers 17 and 18 may be omitted if there is sufficient signal level at the input circuit.

Figure 3:
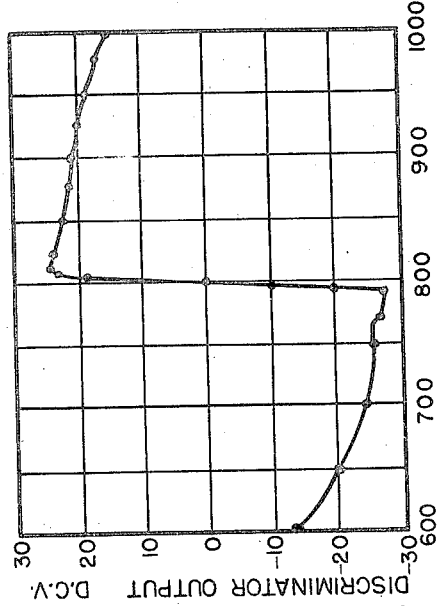
Fig. 3 is a curve of the operating characteristics of the invention.

The diode rectifiers 7 and 8 have suitable load resistors 9 and 10, which feed the direct current output voltage through resistors 11 and 12. The filter 1 and the tuned circuits 2, 3 and 4—5—6 are all tuned to the same frequency. When the input is at this frequency, equal and opposite voltages are set up across resistors 9 and 10, and the direct current output is zero. When the input varies from the resonant frequency of the above circuits, one of the diode voltages increases while the other decreases, and a voltage equal to the difference between the voltages across resistors 9 and 10 appears on the output lead. The sign of this voltage will of course depend upon whether the signal is greater or less than the above resonant frequency; and, if the variation is not too great, its magnitude will depend upon the disparity. Fig. 3 shows the characteristic curve of the discriminator with output voltage plotted against frequency.

The mode of operation of the device is as described below.

Referring to Fig. 1, we see that this discriminator is essentially a phase-comparison system, sometimes called a phase sensitive detector, which involves the familiar principle of adding two alternating current voltages in such a fashion that a change in phase of one of them with respect to the other causes a magnitude difference between the two resultant voltages coming from the system. In this particular circuit, the phase changes are the result of the conjoint action of a plurality of tuned circuits when the frequency of the input signal is varied.

The "phase and magnitude with frequency" characteristics of the voltages to be added will now be considered in order to see how the voltages, at the diodes, $E_A$ and $E_B$, can change in magnitude with respect to one another.

Figure 2:
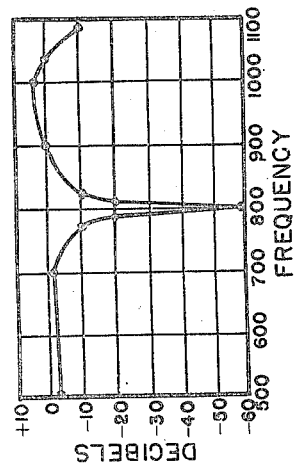
Fig. 2 is a curve showing the characteristics of the filter used.
Figure 4:
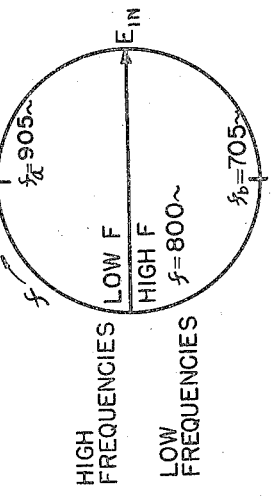
Figs. 4–11 show various vector diagrams of the operation of the device.

Take first the voltage $E_1$ which feeds the center-tap of the phase-comparison transformer 19. This voltage is affected by both the bridged-T filter 1 and the tuned circuit 2 which terminates amplifier 17. The locus of the output voltage of the bridged-T filter 1 with the input voltage as a reference is approximately as shown in the vector diagram of Fig. 4.

Figure 5:
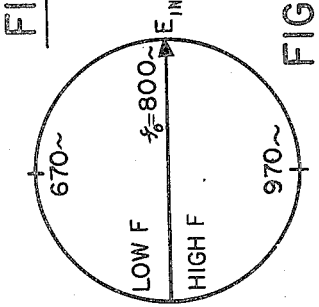

The locus of the voltage vector in the tuned circuit is also approximately a circle, as shown in Fig. 5, when fed with an amplifier tube which acts as a series impedance.

Figure 6:
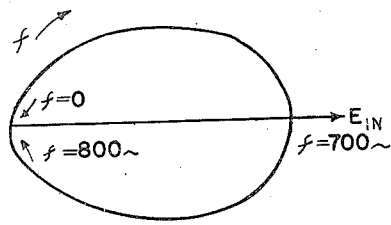

As a result, the locus of $E_1$ with respect to the input voltage is another closed curve which, though perhaps not exactly circular, may, for the purpose of our explanation, be considered as such. However, in the frequency spectrum from zero to infinity, we find that the end of this voltage vector traverses a curve which "goes around twice." The first cycle is shown in Fig. 6, and takes care of the range from zero frequency to resonance or balance point of the filter 1.

Figure 7:
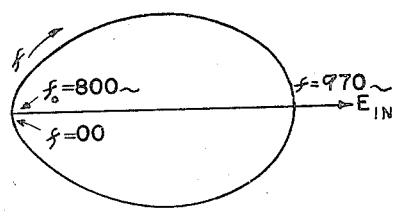

The second cycle is shown in Fig. 7 and takes care of the range from resonance up to infinite frequencies.

Figure 8:
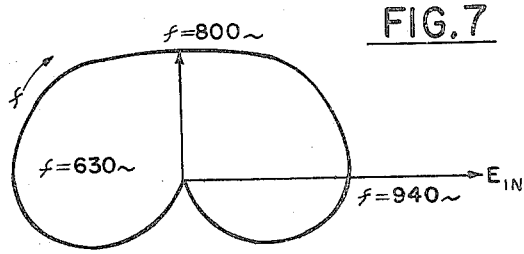

It is evident that $E_1+E_2=E_A$ and $E_1+E_3=E_B$, and what happens to $E_2$ and $E_3$ will now be considered. The primary and secondary coils of the phase-comparison transformer 19 are overcoupled to a large degree. As a result of this fact, it is found that the voltage across the whole secondary $(E_2+E_3)$ has a frequency characteristic as in Fig. 8. $E_2$ exhibits a curve of the same type, but half as large, whereas $E_3$ exhibits a reversed image of this curve, since we refer both voltages to the center-tap of the transformer secondary, that is, $E_3$ is 180° out of phase with $E_2$.

Figure 8A:
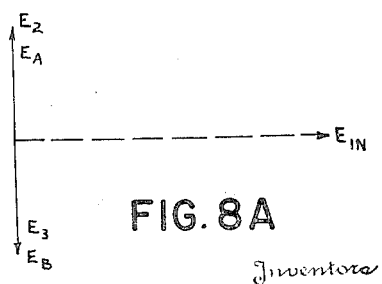

To show what happens to $E_A$ and $E_B$ with frequency, consider the vector diagram of the various voltages at the resonant frequency, Fig. 8A.

$E_1=0$ from its diagrams.

$E_2$ and $E_3$ are equal and opposite, and at 90° to the input voltage.

$$E_A=E_1+E_2$$
$$E_B=E_1+E_3$$

Thus the rectified outputs of diodes A and B are equal and opposite in polarity, thus making the discriminator D. C. output $=0$.

Figures 9, 10:
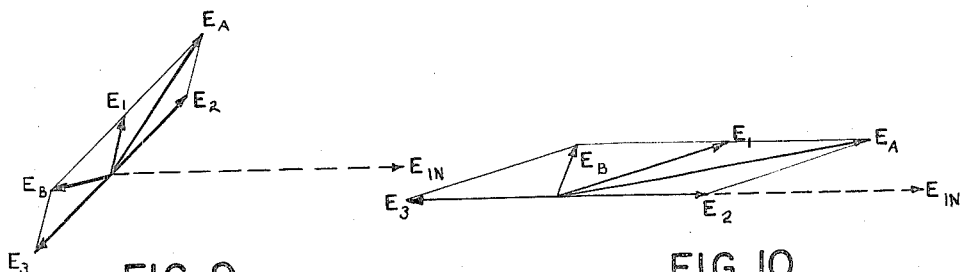

Next, consider a frequency slightly above resonance, which is represented in Fig. 9.

It is easily seen that $E_A$ is considerably greater than $E_B$ and that therefore the D. C. output is positive. Note also that $E_1$ adds to $E_2$ and bucks $E_3$, and that it is not in quadrature with these voltages.

Next consider a frequency of 940 cycles per second. Referring to the drawing, we find the voltages in positions approximately as shown in Fig. 10. The direct current output here approaches a positive peak.

Figure 11:
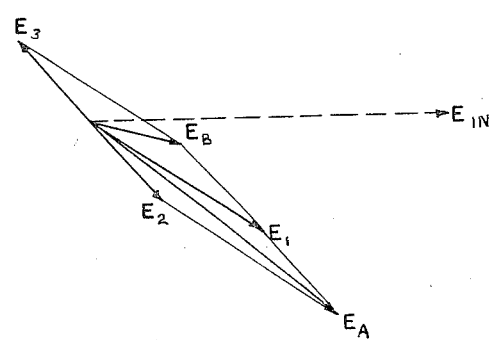

Next consider an increased frequency still further beyond the positive peak and $f=1200$ cycles per second. This is shown in Fig. 11, and it is seen that though the magnitudes of all vectors have decreased considerably, the magnitude of $E_A$ is still greater than that of $E_B$ so that the direct current output is still positive.

For frequencies below 800 cycles per second the operation is just the same except that all vectors rotate in the opposite direction as frequency decreases.

It is evident from Fig. 3 that this device has a very high sensitivity at crossover, and this is due primarily to the fact that the voltage from the bridged-T filter 1 goes through a phase reversal at resonance and acts either to aid $E_2$ and buck $E_3$ or vice versa. Good sensitivity and wide range are both results of the fact that $E_1$ is rotated not only by bridged-T filter 1 but additionally with the help of tuned circuit 2 so as to remain approximately in phase with either $E_2$ or $E_3$, depending upon whether the frequency of input is above or below resonance. The phase reversal characteristic of the filter 1 determines whether $E_1$ is in phase with $E_2$ or $E_3$, according to whether input frequency is above or below resonance.

The invention may be used to control an oscillator through a reactance tube, or for other purposes, as desired. Furthermore the condensers 15 and 16 may be either audio or radio frequency by-pass condensers. If designed for radio frequencies, an additional audio frequency by-pass condenser may be used as a filter on the output lead.

If frequency modulated waves are applied to the discriminator, and 15 and 16 have the proper capacitance, it is evident that the modulation on the waves will appear across resistors 9 and 10, and may be tapped off.

The foregoing description sets forth only the preferred embodiment, and various changes and modifications may be made without departing from the spirit and scope of the invention as defined in the appended claims.

What is claimed is:

1. A frequency discriminator circuit comprising a primary circuit resonant at a predetermined frequency and adapted to receive a signal voltage of variable frequency, a center-tapped secondary circuit resonant at said predetermined frequency inductively related to said primary circuit to produce equal and opposite voltages in the halves of the secondary circuit whose phase with respect to the signal voltage vary with changes in signal voltage frequency, a resonant bridged-T filter connected to said primary circuit and adjusted to produce a voltage and phase variation in the output voltage thereof proportional to variations in signal voltage frequency with respect to the signal voltage, an impedance connected across the output of said bridged-T filter, means connecting one end of said impedance to the center-tap of said secondary circuit, rectifying means to rectify the resultant voltage between the other end of said impedance and each of the end terminals of said secondary circuit, and means to produce an output voltage proportional to the difference between the two direct current voltages produced by said rectifying means.

2. A frequency discriminator circuit including, a primary circuit resonant at a predetermined frequency and adapted to receive a signal voltage of variable frequency, a secondary circuit resonant at said predetermined frequency inductively related to said primary circuit, said secondary circuit being center-tapped to provide equal and opposite voltages whose phase with respect to said signal voltage vary with changes in frequency of the signal voltage, a resonant bridged-T filter connected to receive said signal voltage from said primary circuit, said bridged-T filter adjusted to cause the voltage and phase of the output voltage of the filter with respect to the signal voltage to vary with the frequency of the signal voltage, means to apply the output voltage of said bridged-T filter between the center-tap of secondary circuit and a point of fixed potential, means for rectifying the resultant potentials at the two ends of the secondary circuit with respect to said point of fixed potential, and means for producing an output voltage proportional to the difference between the two rectified voltages produced by the rectifying means.

3. A frequency discriminator circuit comprising; a transformer having a primary coil paralleled by capacitance resonant at a predetermined frequency, a center-tapped secondary coil inductively related to said primary coil and paralleled with capacitance to resonate at said predetermined frequency; said primary coil being adapted to receive an input signal of variable frequency, whereby said secondary coil produces a voltage between the center-tap and one end of said secondary coil which is equal and opposite to the voltage between the center-tap and the other end of said secondary coil and whose phase angle with respect to said input signal voltage varies with variations in input signal frequency; a resonant bridged-T filter circuit connected to said primary coil to also receive said input signal voltage and comprising a center-tapped inductance paralleled by capacitance to resonate at said predetermined frequency and an impedance having one end connected to said center-tap of said inductance, means connecting one end terminal of said inductance coil to one side of said primary circuit and the other end of said impedance to the other side of said primary circuit; a parallel resonant circuit comprising an inductance paralleled by capacitance to resonate at said predetermined frequency, means to connect said resonant circuit to the other end of said center-tapped inductance of said bridged-T filter and to said other end of said impedance, whereby the voltage produced across said resonant circuit varies in phase and magnitude with respect to said input signal voltage with variations in said input signal frequency; means to apply the voltage produced across said resonant circuit between said center-tap of said secondary circuit and ground and a second impedance connected between said center-tap of said secondary circuit and ground; a first rectifying means having a plate and a cathode and a second rectifying means having a plate and a cathode, means for connecting the anode of said first rectifying means to one end terminal of said secondary circuit and the cathode of said second rectifying means to the other end terminal of said secondary circuit, a first center-tapped resistance having its center-tap connected to ground, one end of said first center-tapped resistance being connected to the cathode of said first rectifying means and the other end of said first center-tapped resistance being connected to the anode of said second rectifying means and a second center-tapped resistance connected across said first center-tapped resistance, whereby the output of the discriminator circuit is the voltage between the center-tap of said second center-tapped impedance and ground.

PAUL B. SEBRING.
HARVEY BROOKS.

REFERENCES CITED

The following references are of record in the file of this patent:

UNITED STATES PATENTS

| Number | Name | Date |
|---|---|---|
| 1,697,945 | Beverage | Jan. 8, 1929 |
| 1,921,022 | Burton | Aug. 8, 1933 |
| 2,121,103 | Seeley | June 21, 1938 |
| 2,309,481 | Summerhayes | Jan. 26, 1943 |
| 2,371,285 | Crosby | Mar. 13, 1945 |
| 2,415,468 | Webb | Feb. 11, 1947 |